United States Patent [19]

Yokoyama et al.

[11] Patent Number: 5,569,882

[45] Date of Patent: Oct. 29, 1996

[54] WATERPROOF PROTECTIVE COVER

[75] Inventors: Kazuaki Yokoyama; Michitaka Kinoshita; Yukio Ohashi; Yasuhiro Suzuki, all of Shizuoka-ken, Japan

[73] Assignee: Yazaki Corporation, Tokyo, Japan

[21] Appl. No.: 338,765

[22] Filed: Nov. 10, 1994

[30] Foreign Application Priority Data

Nov. 10, 1993 [JP] Japan .................................. 5-281053

[51] Int. Cl.⁶ .................................................. H02G 15/113
[52] U.S. Cl. .............................. 174/76; 174/92; 174/138 F
[58] Field of Search ............................ 174/92, 138 F, 174/76, 88 R, 84 R

[56] References Cited

U.S. PATENT DOCUMENTS

| | | | |
|---|---|---|---|
| 3,519,731 | 7/1970 | Grunbaum | 174/138 |
| 3,683,314 | 8/1972 | Elkins | 339/39 |
| 3,842,191 | 10/1974 | Neale, Sr. | 174/88 R |
| 4,029,896 | 6/1977 | Skinner | 174/138 F |
| 4,550,220 | 10/1985 | Kitchens | 174/138 F |
| 4,721,830 | 1/1988 | Dagan et al. | 174/41 X |
| 4,795,857 | 1/1989 | McInnis | 174/138 F |
| 4,849,580 | 7/1989 | Reuter | 174/92 |
| 4,859,809 | 8/1989 | Jervis | 174/92 |
| 4,863,535 | 9/1989 | More | 156/49 |
| 5,021,611 | 6/1991 | Amano | 174/88 R |
| 5,030,798 | 7/1991 | Schilling | 174/92 |
| 5,038,003 | 8/1991 | Allec et al. | 174/138 F |
| 5,347,084 | 9/1994 | Roney et al. | 174/92 |
| 5,397,859 | 3/1995 | Robertson et al. | 174/92 |

FOREIGN PATENT DOCUMENTS

| | | |
|---|---|---|
| 995315 | 8/1976 | Canada . |
| 3320916 | 12/1994 | Germany . |
| 59-109175 | 7/1984 | Japan . |
| 59-119576 | 8/1984 | Japan . |
| 6-9064 | 2/1994 | Japan . |
| 6-41060 | 5/1994 | Japan . |

Primary Examiner—Kristine L. Kincaid
Assistant Examiner—Chau N. Nguyen
Attorney, Agent, or Firm—Wigman, Cohen, Leitner & Myers, P.C.

[57] ABSTRACT

A waterproof protective cover includes an upper casing member and a lower casing member pivotably connected to the upper casing member through a hinge. When the upper casing member is fitted to the lower casing member, a storage chamber for accommodating a connection part of connected wires is defined by the casing members. The upper and lower casing members are provided on respective interior walls thereof with reinforcement ribs which extend in the longitudinal direction of the casing members and which are positioned between the electrical wires accommodated in the casing members. With the arrangement, it is possible to increase the rigidity of the upper and lower casing members.

20 Claims, 7 Drawing Sheets

FIG. 10B

WATERPROOF PROTECTIVE COVER

BACKGROUND OF THE INVENTION

The present invention relates to a waterproof protective cover for protecting a connection part of electrical wires in a waterproof manner.

Conventional arts include a protective covers for electrical wires, which is disclosed in Japanese Utility Model Publication No. 59-119576.

This protective cover consists of two semi-cylindrical bodies which are pivotably connected to each other by hinges so as to open and close the semi-cylindrical bodies. Each of the semi-cylindrical bodies includes an outer shell and an inner wall arranged inside the outer shell to extend along a periphery of the cover. Inside the protective cover, an inner chamber is defined by the inner wall and an elongated clearance is formed between the outer shell and the inner wall. The protective cover is provided at both ends thereof in the longitudinal direction with openings which are coaxially arranged to each other for passing an electrical wire therethrough. On respective lateral edges of the bodies opposite to the hinges, a pair of latching members are arranged to engage the semi-cylindrical body with the other body. The inner chamber surrounded with the inner wall is filled with insulating compounds. In a pre-using state of the cover, thin sheets are arranged on the compounds filled in the respective semi-cylindrical bodies in order to prevent the filled compound from drying and hardening.

In case of using the above-mentioned cover, after tearing off the thin sheets, a connection part of the electrical wires connected to each other by press-fitting or the like is positioned in the inner chamber and then the semi-cylindrical bodies are closed by engaging the latching member to the other member, whereby the connection part can be protected in the cover.

In the above mentioned protective cover, however, since each of the semi-cylindrical bodies is formed to be of small wall-thickness, it is apt to be so deformable because of its weakened rigidity. Therefore, even though the connection part of electrical wires is sealed by a sealant such as the insulating compounds, there is caused a problem that, by a deformation of the semi-cylindrical bodies, a clearance may be produced between the inner wall of each semi-cylindrical body and the sealant, so that the water intrudes into the body through the clearance.

Furthermore, in case of arranging the connected electrical wires in the semi-cylindrical bodies, there is raised a possibility that, since the connection part is not restricted in position in the semi-cylindrical bodies, the part may be arranged close to either of the openings unequally or may be arranged in the vicinity of the pair of latching members, resulting in a failure of satisfactory waterproof.

In addition, in case that, after superimposing the connection part of the wires on the insulating compounds retained in one semi-cylindrical body at the substantial center thereof, then the other semi-cylindrical body is overlaid thereon, there,is caused a problem that each electrical wire is deviated from the opening, so that the semi-cylindrical bodies cannot be locked to each other. In such a case and if an operator engages the semi-cylindrical bodies with each other by force, there may be caused a problem that the wires are damaged unfortunately.

SUMMARY OF THE INVENTION

It is therefore an object of the present invention to provide a waterproof protective cover having an enhanced sealing function, achieved by increasing the rigidity of upper and lower casing members of the waterproof protective cover, and which can fix the connected electrical wires securely to the upper and lower casing members by restricting any movement of the wires in the casing members.

The object of this invention as described above can be accomplished by a waterproof protective cover for protecting a connection part of electrical wires in a waterproof manner, comprising:

an upper casing member having openings formed at both ends in a longitudinal direction thereof to pass the electrical wires therethrough; and a lower casing member pivotably connected to the upper casing member through a hinge attached to each sidewall of the upper and lower casing members, the lower casing member having openings formed at both ends in a longitudinal direction thereof to pass the electrical wires therethrough;

wherein a storage chamber for accommodating the connection part is defined by the upper and lower casing members when the upper casing member is fitted to the lower casing member, the storage chamber being filled up with an insulating sealant;

wherein at least either the upper casing member or the lower casing member is provided on a bottom wall thereof with a reinforced rib which extends in the longitudinal direction thereof and which is positioned between the electrical wires in the storage chamber.

With the arrangement in which the reinforced rib is provided on the bottom wall of either the upper casing member or the lower casing member, it is possible to increase the rigidity of the upper (or lower) casing member provided with the rib. Therefore, there can be reduced a possibility that a clearance is produced between the upper and lower casing members and the insulating sealant.

In the present invention, preferably, at least either the upper casing members or the lower casing member further includes partition walls which are formed on both sides of the bottom wall in the longitudinal direction thereof and which define a sealant-charging section to be filled with the insulating sealant in the storage chamber under condition that the upper casing member is fitted to the lower casing member. And preferably, the reinforced rib is arranged in the sealant-charging section. In this case, since the reinforced rib between the electrical wires is arranged in the sealant charging section into which the insulating sealant is charged, it is not only possible to supply the sealant between the electrical wires certainly but also possible to reduce an amount of sealant to be charged into the sealant-charging section.

Further preferably, in the present invention, the reinforced rib has a semi-circular cross section. In this case, such a reinforced rib allows the sealant to intrude between the electrical wires radially, namely in the direction to expand the wires from each other, thereby improving the waterproofing effectiveness.

In the present invention, preferably, the partition walls are provided on both the upper and lower casing members and furthermore, under condition that the upper casing member is fitted to the lower casing member, the partition walls define apertures for passing the electrical wires therethrough. With such an arrangement, it is not only possible to prevent the electrical wires from lifting from the upper and lower casing members but it is also possible to restrict movement of the wires to any direction intersecting the longitudinal direction of the casing members.

Preferably, either the upper casing member or the lower casing member is provided in the vicinity of the partition walls thereof with wire-fixing ribs. In this case, by a provision of the wire-fixing ribs, it is possible to fix the electrical wires to the upper and lower casing members securely.

Furthermore, it is preferable that the wire-fixing ribs consist of a plurality of flexible vertical walls which stand from the bottom wall of the upper or lower casing member and spherical supports which are arranged on respective upper ends of the vertical walls. In this case, normally, each electrical wire is inserted between the vertical walls through a clearance between the spherical supports. Then, because of their flexibility, the vertical walls are elastically deformed to expand the clearance so that the electrical wire can be easily inserted between the vertical walls. Thereafter, since the vertical walls return to their respective positions to reduce the clearance, it is possible to prevent the electrical wire from escaping therefrom. Consequently, the electrical wires can be fixed to the upper and lower casing members securely.

Further, it is preferable that the upper casing member is connected to the lower casing member through the intermediary of a hinge and that either the upper casing member or the lower casing member is provided with a wire-fixing rib. The rib can be provided in the vicinity of the hinge with a thickened part for reinforcement. The other casing member can be provided on the sidewall thereof close to the hinge with a projection which is brought into contact with the thickened part under condition that the upper casing member is fitted to the lower casing member. In this case, the projection abuts on the thickened part to press the wire-fixing rib toward the adjacent wire-fixing rib. Consequently, it is possible to fix the wires on the upper and lower casing members securely without moving the wires in the storage chamber. Further, by providing the thickened part on the wire-fixing rib close to the hinge, the strength of the wire-fixing rib can be improved.

Furthermore, according to present invention, there is also provided a waterproof protective cover for protecting a connection part of electrical wires in a waterproof manner, comprising:

an upper casing member having openings formed at both ends in a longitudinal direction thereof to pass the electrical wires therethrough; and a lower casing member pivotably connected to the upper casing member through a hinge attached to each sidewall of the upper and lower casing members, the lower casing member having openings formed at both ends in a longitudinal direction thereof to pass the electrical wires therethrough;

wherein a storage chamber for accommodating the connection part is defined by the upper and lower casing members when the upper casing member is fitted to the lower casing member, the storage chamber being filled up with an insulating sealant;

wherein at least either the upper casing member or the lower casing member is provided on a bottom wall thereof with positioning ribs which are arranged between the electrical wires to separate them from each other and which have curved surfaces at both ends in the longitudinal direction thereof thereby to smooth the flowing of the sealant when the upper casing member is fitted to the lower casing member.

With the above-mentioned arrangement, inserting the positioning ribs between the electrical wires allows the wires to be positioned in the storage chamber, so that it is possible to prevent moving the wires in the chamber. Further, in this case, when the upper casing member is fitted to the lower casing member, the sealant can flow smoothly along the curved surfaces of the ribs without being interrupted by the ribs.

Other objects and features of the present invention will become more fully apparent from the following description and appended claims taken in conjunction with the accompanying drawings.

DESCRIPTION OF THE PREFERRED EMBODIMENT

Embodiments of the present invention will be described with reference to the drawings hereinafter.

The First Embodiment

Figure 1:
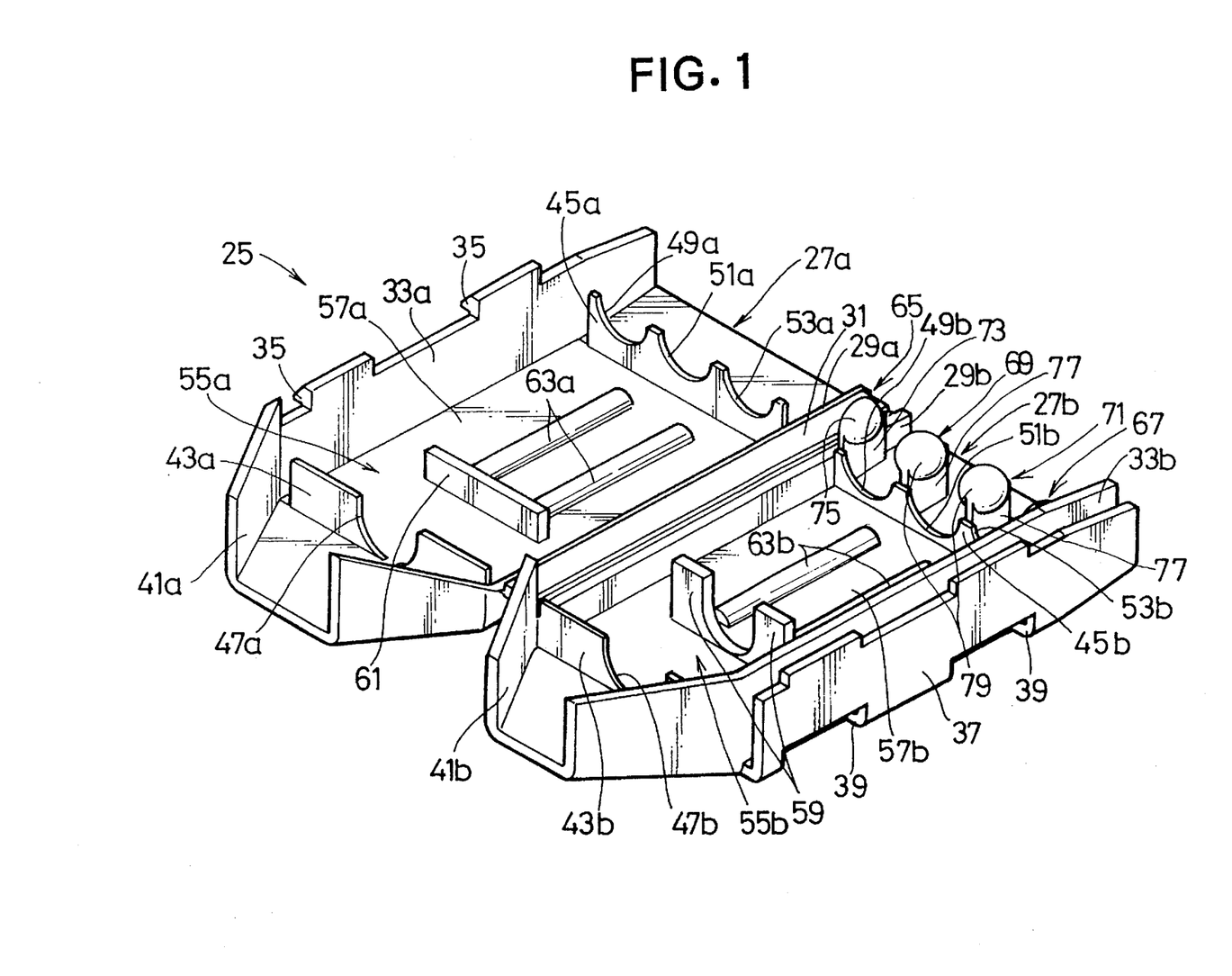
FIG. 1 is a perspective view showing a waterproof protective cover in accordance with a first embodiment of the present invention.
Figure 2:
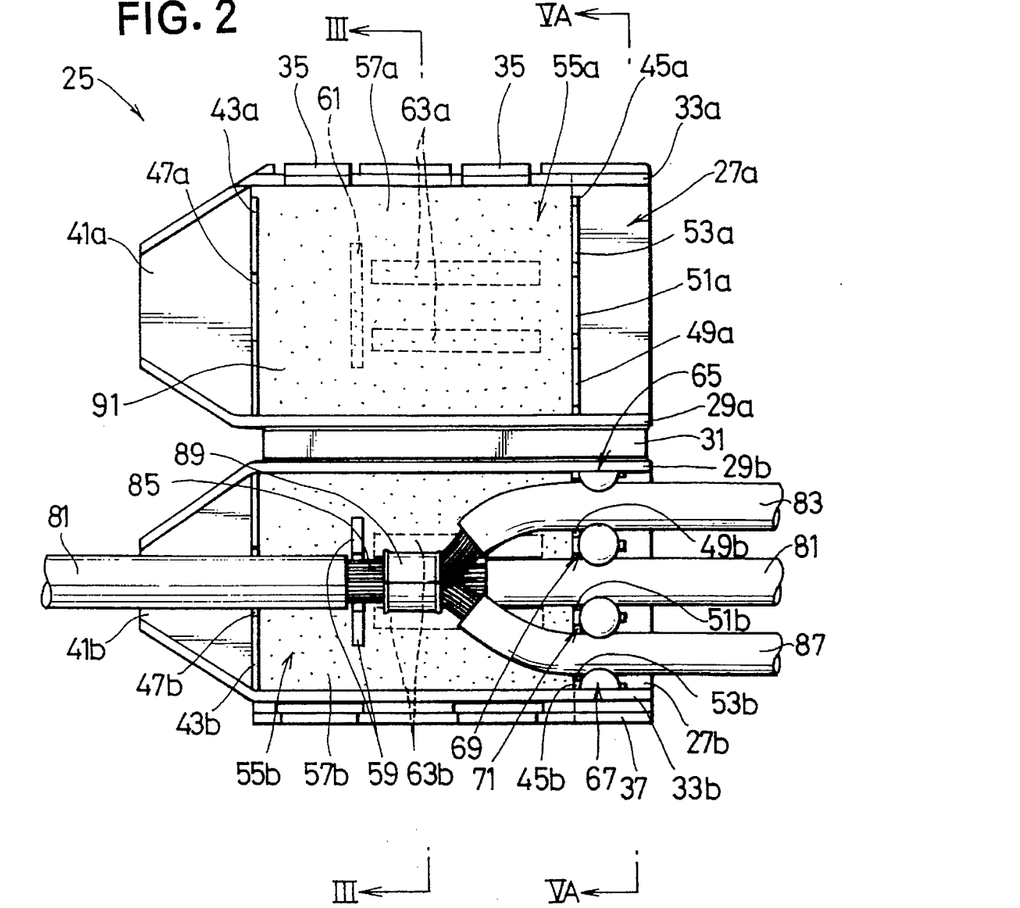
FIG. 2 is a plan view of the waterproof protective cover of FIG. 1.

As shown in FIGS. 1 and 2, a waterproof protective cover 25 in accordance with the invention includes an upper casing member 27a and a lower casing member 27b, which are complementary halves of the cover 25. These casing members 27a and 27b can be obtained by molding a box-shaped casing out of resinous insulating material and then cutting the casing into two halves in a longitudinal direction of the casing such that a hinge 31 remains.

Sidewalls 29a and 29b of the upper and lower casing members 27a and 27b, which correspond to respective marginal portions on left and right sides of the members 27a and 27b in the longitudinal direction, are pivotably connected through the intermediary hinge 31, whereby the upper and lower casing members 27a and 27b can open and close to each other.

Two projections 35 are arranged on an outer surface of a sidewall 33a of the upper casing member 27b. On the other hand, the lower casing member 27b is provided on an outer surface of a sidewall 33b thereof with a flexible engagement wall 37. When the upper casing member 27a is fitted to the lower casing member 27b, the sidewall 33a is inserted between the engagement wall 37 and the sidewall 33b, so that the projections 35 can be engaged in respective engagement holes 39 formed in a lower part of the sidewall 33b instantly.

Further, each of the upper and lower casing members 27a and 27b has openings formed on both ends in the longitudinal direction thereof. End portions of the upper and lower casing members 27a and 27b in the vicinity of the opening on one side thereof are tapered to converge toward the respective openings, providing orifices 41a and 41b for passing electrical wires therethrough, respectively.

In the upper and lower casing members 27a and 27b, first partition walls 43a and 48b and second partition walls 45a and 45b are arranged to extend in a direction substantially perpendicular to the longitudinal direction of the casing members 27a and 27b. First hole elements 47a and 47b defining a first hole are formed at seams of the first partition walls 48a and 48b. Similarly, second hole elements 49a, 49b, 51a, 51b, 53a and 53b providing second holes are formed at seams of the second partition walls 45a and 45b.

Also in the upper and lower casing members 27a and 27b, complementary halves 55a and 55b of a storage chamber are formed to accommodate the connection part of the electrical wires therein. These halves will be simply referred to as storage chambers, hereinafter. Defined in the storage chambers 55a and 55b by the first and second partition walls 43a, 43b, 45a and 45b is a sealant-charging section of the present cover, into which the insulating sealant is charged. In this cover, the first and second partition walls 43a, 43b, 45a and 45b serve to prevent the sealant from leaking out of the sealant-charging section. Again, under the condition that the upper casing member 27a is fitted to the lower casing member 27b, the first hole elements 47a and 47b and the second hole elements 49a, 49b, 51a, 51b, 53a and 53b define through-holes through which the electrical wires 81, 83 and 87 pass, respectively.

A pair of wire positioning ribs 59 are formed on a bottom wall 57b of the storage chamber 55b. On the other hand, the storage chamber 55a is provided on a bottom wall 57a thereof with a press rib 61 which is brought into contact with the pair of positioning ribs 59 under the fitting condition of the upper and lower casing members 27a and 27b. On the bottom walls 57a and 57b of the storage chambers 55a and 55b, two pair of reinforced ribs 63a and 63b of semi-circular cross-sections are arranged between the press rib 61 and the second partition wall 45a and between the positioning ribs 59 and the second partition wall 45b to extend in parallel with the longitudinal direction of the casing members 27a and 27b, respectively.

On an opening side of the second partition wall 45b, wire-fixing ribs 65 and 67 are provided on sides of the sidewalls 29b and 33b, respectively, and spherical wire-fixing ribs 69 and 71 are provided between the second hole elements 49b, 51b, and 53b. The wire-fixing ribs 65 and 67 consist of legs 73 which stand on the bottom wall 57b on respective sides of the sidewalls 29b and 33b and semi-spherical supports 75 which are arranged on the respective upper ends of the legs 73 to project inside the lower casing member 27b. On the other hand, the wire-fixing ribs 69 and 71 are constituted by flexible legs (vertical walls) 77 which stand on the bottom wall 57b between the second hole elements 49b and 51b and between the second hole elements 51b and 53b, respectively, and spherical supports 79 which are arranged on respective upper ends of the legs 77. The distance between the supports 75 and 79 and a distance between the support 79 and the adjacent support 79 are configured smaller than the outer diameter of the wire 81. Further, the distance between the legs 73 and 77 and the distance between the leg 77 and the adjacent leg 77 are configured substantially equal to the outer diameter of the wire 81. The height of the first partition wall 45a from the bottom wall 57a is preferably larger than that of the second partition wall 45b from the bottom wall 57b.

Figure 3:
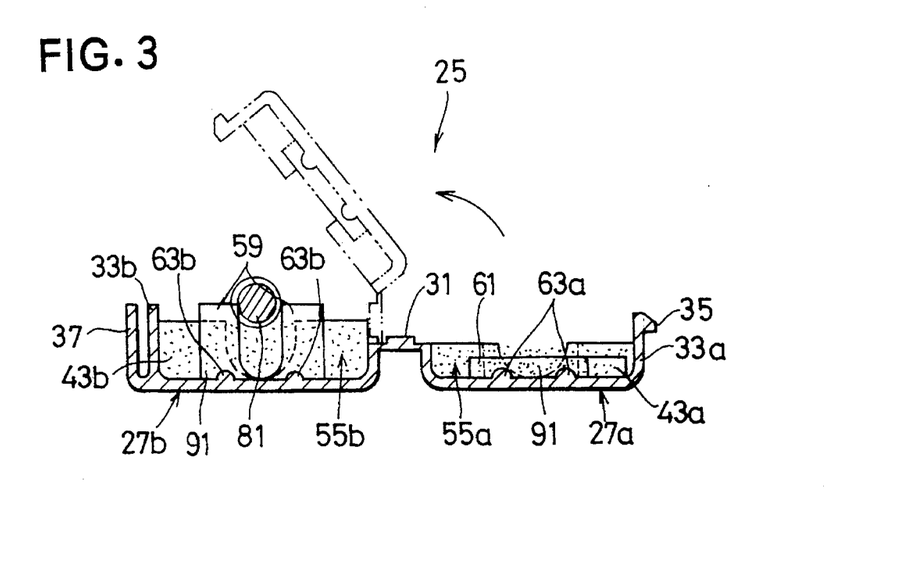
FIG. 3 is a cross-sectional view of the waterproof protective cover of FIG. 1, taken along a line of III—III of FIG. 2.
Figure 4:
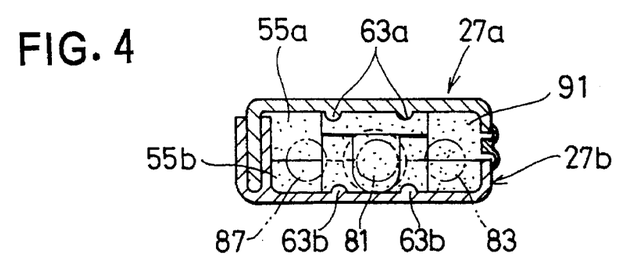
FIG. 4 is a cross-sectional view of the waterproof protective cover of FIG. 1, showing a condition that the lower casing member is covered with the upper casing member.

In order to protect a connection part 89 at which subordinate lines (wires 83 and 87) are connected to the main line (wire 81) by means of the so-constructed waterproof protective cover 25, the upper and lower casing members 27a and 27b are opened to each other at first and a sealant 91, such as a butyl rubber, is then charged into the storage chambers 55a and 55b. Thereafter, the connection part 89 is accommodated into the storage chamber 55b of the lower casing member 27b. At this time, one side of the wire 81 is positioned on the sealant 91 above the first partition wall 43b as shown in FIG. 3 and the other side of the wire 81 is inserted into the second hole element 51b, whereby a bundle of core lines 85 of the wire 81 is inserted between the positioning ribs 59 and 59 as shown in FIG. 2. Simultaneously, the other wires 83 and 87 are introduced into the second hole elements 49b and 53b, respectively.

Figure 5A:
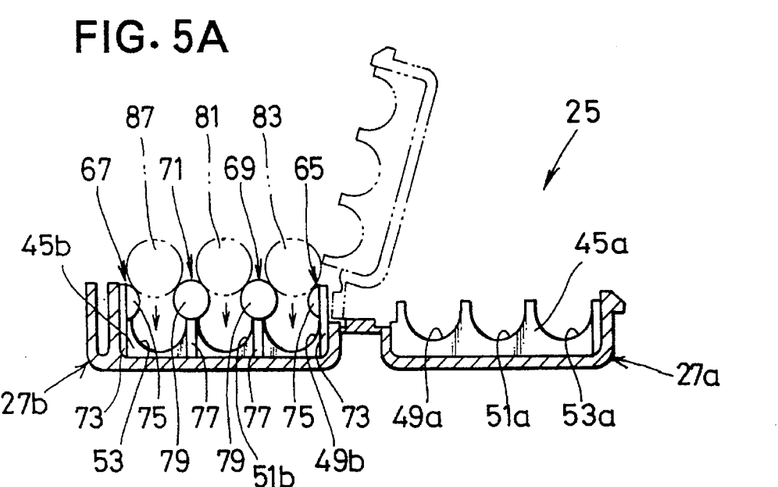
FIG. 5A is a schematic cross-sectional view of the waterproof protective cover of FIG. 1, taken along a line of VA—VA of FIG. 2, showing a condition thereof before the electrical wires are accommodated into the lower casing member.

Provided that the wire 81 is pressed and inserted between the supports 79 in the process of passing the other side of the wire 81 through the second hole element 51b, the flexible legs 77 are wound to the left and right in FIG. 5A, respectively, to separate the supports 79 from each other. After the wire 81 has been inserted into the second hole element 51b, the legs 77 return to their respective original positions, thereby preventing the wire 81 from escaping from the second hole part 51b. On the other hand, when inserting the wire 83 into the second hole element 49b, the leg 77 of the wire-fixing rib 69 is moved to the left in FIG. 5 to increase the clearance between the supports 75 and 79. After the wire 83 has been inserted into the second hole element 51b, the leg 77 returns to its original position, thereby preventing the wire 83 from escaping from the second hole part 49b. Similarly, in inserting the wire 87 into the second hole element 53b, the leg 77 of the wire-fixing rib 69 is moved to the right in FIG. 5 to increase the clearance between the supports 75 and 79. Then, after the wire 87 has been inserted into the second hole element 53b, the leg 77 returns to its original position, thereby preventing the wire 83 from escaping from the second hole part 53b.

Figures 5B, 5C:
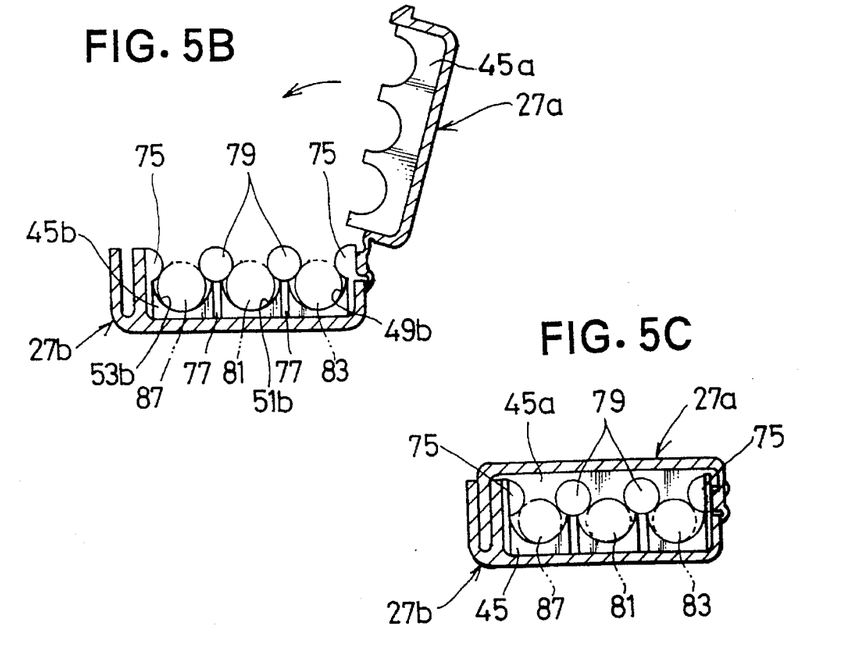
FIG. 5B is a schematic cross-sectional view of the waterproof protective cover, showing a sequent condition that the electrical wires have been just accommodated into the lower casing member.
FIG. 5C is a schematic cross-sectional view of the waterproof protective cover, showing a sequent condition that the lower casing member is covered with the upper casing member under condition that the electrical wires are accommodated into the lower casing member.

After accommodating the connection part 89 in the lower casing member 27b into which the sealant 91 has been previously charged, the upper casing member 27a is rotated to close together with the upper part of the lower casing member 27b. Then, since the first partition wall 43a of the upper casing member 27a is brought into contract with the first partition wall 43b of the lower casing member 27b, the aperture for passing the wire can be defined by the first hole elements 47a and 47b. Correspondingly, since the press-rib 61 is arranged on the pair of positioning ribs 59, the bundle of the core lines 85 can be positioned between the positioning ribs 59 and 59. Further, since the second partition wall 45a of the upper casing member 27a is brought into contract with the second partition wall 45b of the lower casing member 27b, the aperture for passing the wire can be defined by the second hole elements 49a, 49b, 51a, 51b, 53a and 53b, whereby it is possible to prevent the wires 81, 83 and 87 from lifting from the second hole elements 49b, 51b and 53b, respectively, as shown in FIGS. 5B and 5C.

As mentioned above, according to the invention, by fixing the wires 81, 83 and 87 to the wire-fixing ribs 65, 67, 69 and 71, it is possible to avoid lifting and displacing of the wires accommodated in the casing members 27a and 27b, so that the workability in attaching the wires can be improved.

Further, owing to the spherical supports 79, the electrical wires can be easily inserted into the second hole elements 49a, 49b, 51a, 51b, 53a and 53b and the wires can be easily removed therefrom. Furthermore, the electrical wires can be fixed to the upper and lower casing members securely, irrespective of the diameter of each wire.

Additionally, according to the invention, since the reinforced ribs 63a and 63b of semi-circular cross sections project upwardly between the wires 81 and 87 and between the wires 81 and 83, respectively, the sealant 91 can be charged between the wire 81, 83 and 87 for assured insulative protection. That is, such a configuration of the reinforced ribs 63a and 63b allows the sealant 91 to be squeezed radially, so that it is possible to supply the sealant 91 between the wires 81, 83 and 87 so as to expand the clearances defined therebetween.

Again, according to the invention, by providing the reinforced ribs 63a and 63b on the bottom walls 57a and 57b of the upper and lower casing members 27a and 27b, respectively, the strength of the members can be improved. Furthermore, in the invention, since the reinforced ribs 63a and 63b project in the storage chambers 55a and 55b, respectively, the capacities thereof are reduced to save an amount of the sealant 91 to be charged, whereby the protective cover can be lightened.

Other embodiments of the present invention will be described below. Through these embodiments, the elements similar to those in the afore-mentioned first embodiment are indicated by the same reference numerals and overlapping descriptions relevant to those elements are deleted.

The Second Embodiment

Figure 6:
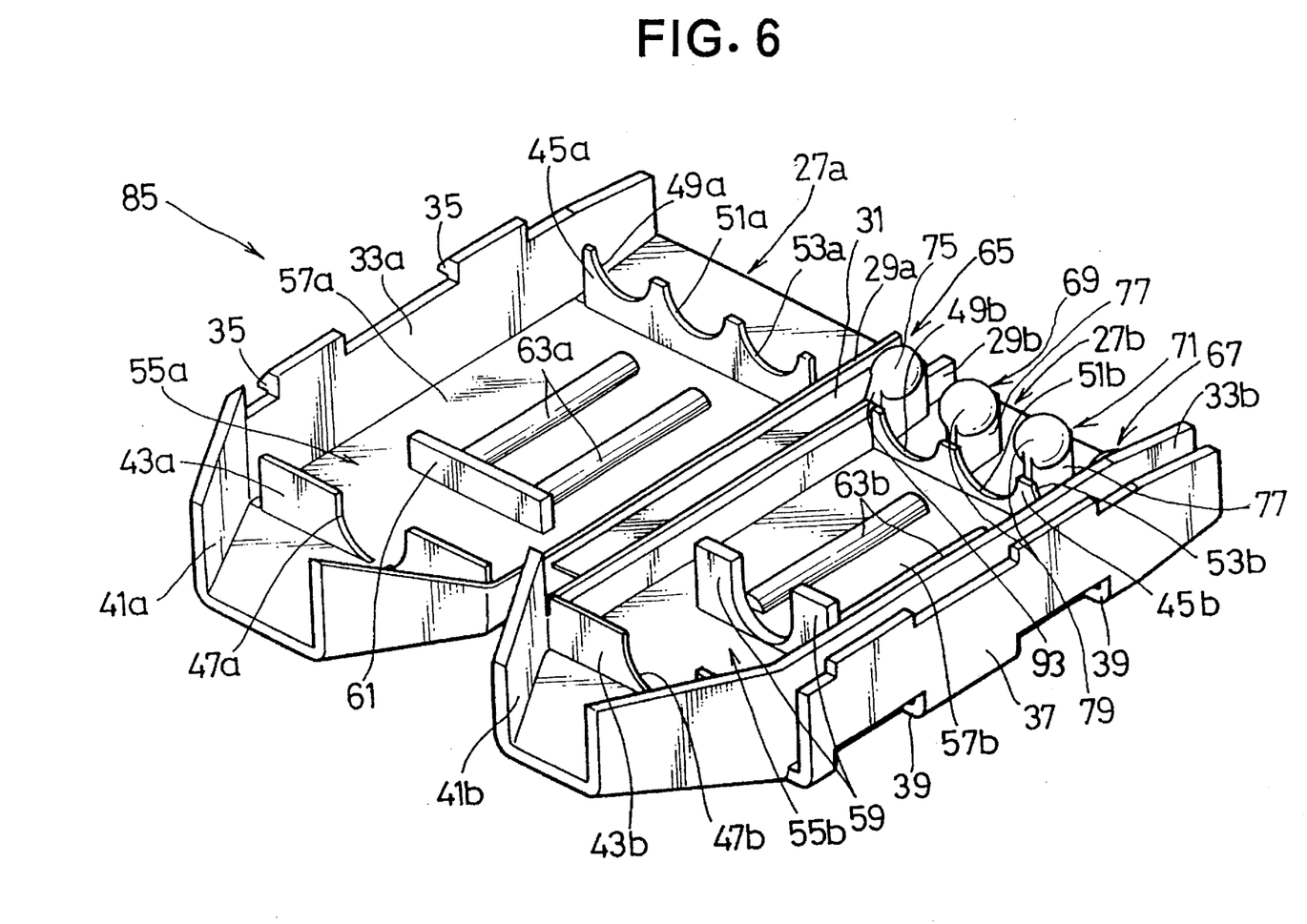
FIG. 6 is a perspective view showing a waterproofing protective cover in accordance with a second embodiment of the present invention.
Figure 7A:
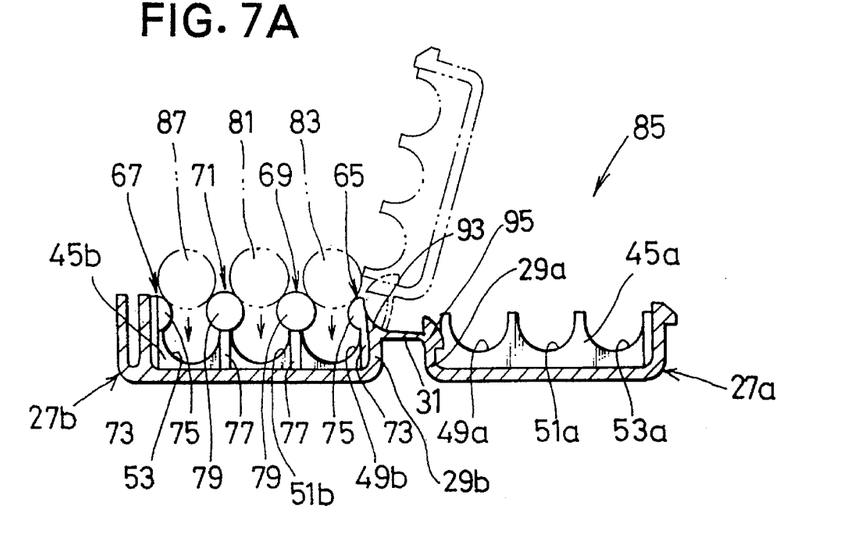
FIG. 7A is a schematic cross-sectional view of the waterproofing protective cover of FIG. 6, showing a condition thereof before the electrical wires are accommodated into the lower casing member.
Figure 7B:
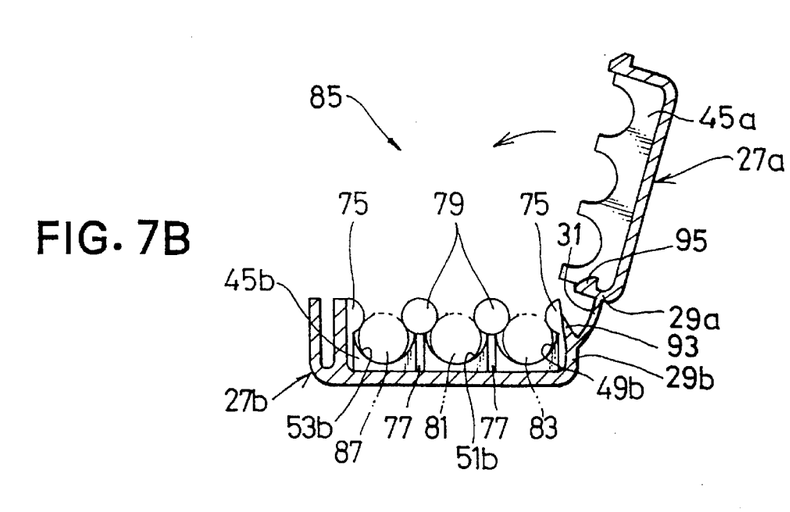
FIG. 7B is a schematic cross-sectional view of the waterproofing protective cover, showing a sequent condition that the electrical wires have been just accommodated into the lower casing member.
Figure 7C:
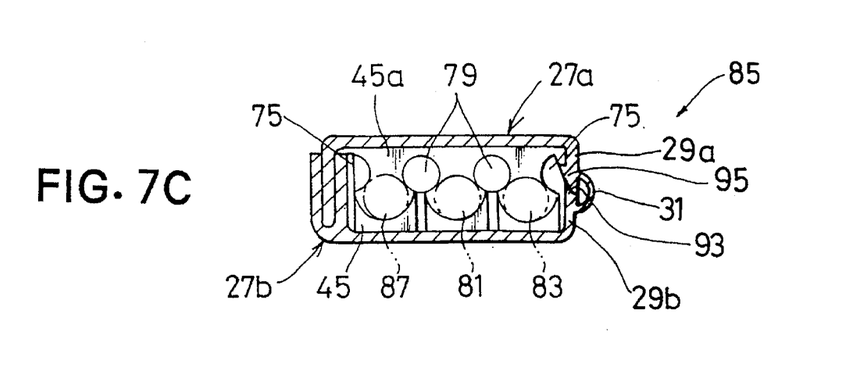
FIG. 7C is a schematic cross-sectional view of the waterproofing protective cover, showing a sequent condition that the lower casing member is covered with the upper casing member under condition that the electrical wires are accommodated into the lower casing member.

The second embodiment is shown in FIGS. 6, 7A, 7B and 7C. In the embodiment, while the sidewalls 29a and 29b of the casing members 27a and 29b are connected to each other through the intermediary of hinge 31, a thickened part 93 for reinforcement is provided in the wire-fixing rib 65 of the lower casing member 27b in the vicinity of the hinge 31. On the other hand, the upper casing member 27a is provided on the sidewall 29a close to the hinge 31 with a projection 95. When the upper casing member 27a is fitted to the lower casing member 27b, the projection 95 is brought into contact with the thickened part 93 thereby to press the wire-fixing rib 75 toward the adjacent wire-fixing rib 79, as shown in FIG. 7C.

Since the wire-fixing rib 65 on the lower casing member 27a is arranged on the side of the sidewall 29b, the support 75 on the leg 73 is shaped to be substantially semi-spherical. Consequently, under condition that the wire 83 is inserted between the neighboring spherical supports 79, the support 75 may be broken because of its small thickness. This is a reason why the above thickened part 93 is provided in the vicinity of the sidewall 29b for reinforcing the support 75.

Provided that the wire 83 is pressed between the supports 75 and 79 and then inserted into the second hole elements 49b as shown in FIGS. 7A and 7B, the flexible legs 73 and 77 respectively supporting the supports 75 and 79 are moved apart from each other so as to provide a space therebetween. After the respective wire 83 has been inserted into the second hole element 49b, the legs 73 and 77 return to the respective original positions, thereby preventing the wire 83 from escaping from the second hole elements 49b.

After accommodating the connection part 89 in the lower casing member 27b, the upper casing member 27a is rotated to close the upper part of the lower casing member 27b, as shown in FIG. 7C. At this time, since the projection 95 abuts on the thickened part 93 to press the support 75 against the support 79, the support 75 is moved toward the support 79. As a result of this, the distance between the supports 75 and 79 can be narrowed down.

According to the embodiment, since the support 75 is reinforced by the provision of thickened part 93 on the back of the support 75 on the hinge-side of the lower casing member 27b, the problem of breaking of the support 75 at the time of insertion of the wire 83 between the supports 75 and 79 can be avoided. Furthermore, as described above, under condition that the upper casing member 27a is fitted to the lower casing member 27b, the projection 95 abuts on the thickened part 93 to move the support 75 close to the adjacent support 79. Consequently, the distance between the supports 75 and 79 can be narrowed down, whereby it is possible to securely hold the wire 83 inserted therebetween.

The Third Embodiment

Figure 8:
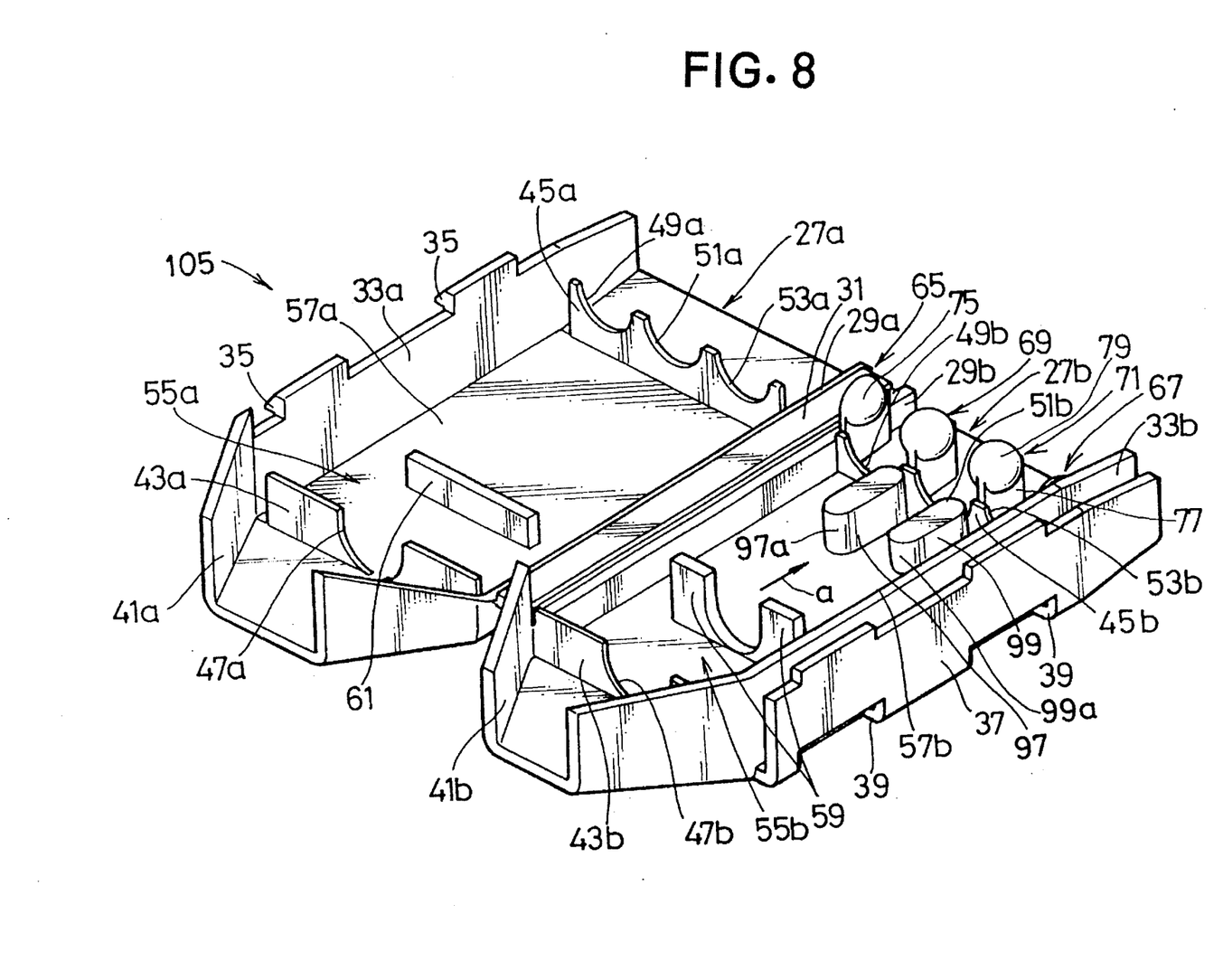
FIG. 8 is a perspective view showing a waterproofing protective cover in accordance with a third embodiment of the present invention.
Figure 9:
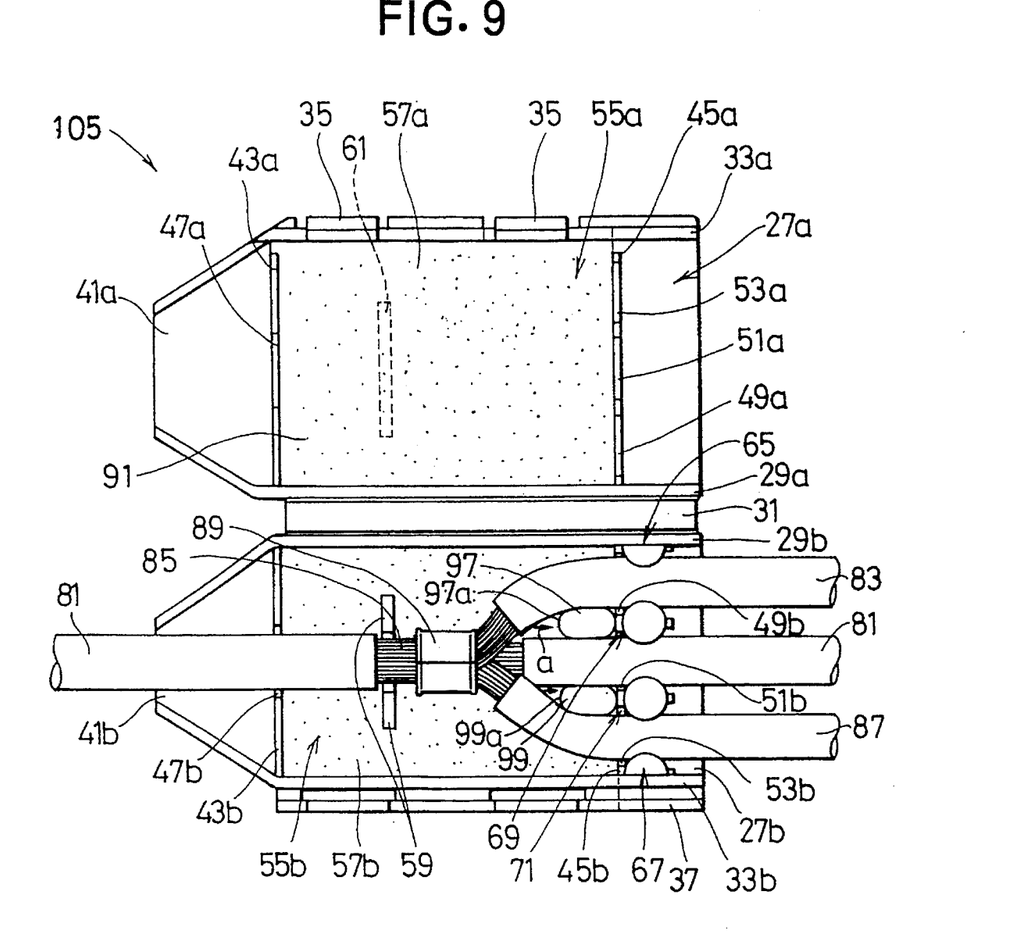
FIG. 9 is a plan view of the waterproofing protective cover of FIG. 8.

FIGS. 8 to 9 show the third embodiment of the present invention. A waterproof protective cover 105 in accordance with the embodiment is provided with further positioning ribs 97 and 99 formed on the bottom wall 57b of the lower casing member 27b. Each of the positioning ribs 97 and 99 is formed so as to have a height higher than the height of the sealant 91 charged into the storage chamber 55b. The positioning ribs 97 and 99 serve to separate the wires 83 and 87, which have been diverged from the wire 81 at the connection part 89, from the wire 81 certainly. In detail, under the assembled condition, the positioning rib 97 is inserted between the wire 81 and 83 and the other positioning rib 99 is inserted between the wire 81 and 87, so that the wires 81, 83 and 87 can be separated from each other.

Figure 10A:
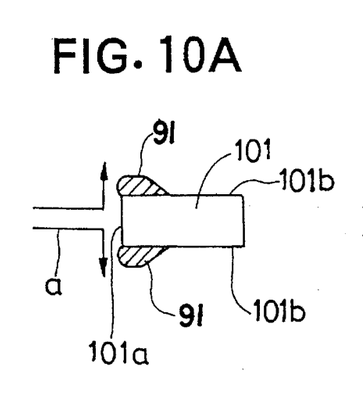
FIG. 10A is a plan view showing a relationship between of the flow of the sealant and a positioning rib having flat surfaces.

In addition, the ribs 97 and 99 are formed so as to have curved surfaces 97a and 99a at both ends in the longitudinal direction thereof. With the above-mentioned configuration of the ribs 97 and 99, when the upper casing member 27a is fitted to the lower casing member 27b, it is possible to smooth the flowing of the sealant 91 in the direction of an arrow a of FIG. 8. Accordingly, the problem of air bubbles forming about the positioning ribs 97 and 99 is avoided. Conversely, as shown in FIG. 10A, if a positioning rib 101 has a flat surface 101a at an end thereof in the longitudinal direction, the flowing direction of the sealant, 91 would be changed to a direction perpendicular to the direction of a after striking against the surface 101a and then the sealant 91 would flow apart from side surfaces 101b of the rib 101 at both edges where the respective side surfaces 101b intersect with the surface 101a. This is because the sealant 91 has a relatively high stickiness (stickiness: $3.5 \times 10^4$ to $4.5 \times 10^4$ poise at 40° C.), so that it is difficult to change the flowing direction of the sealant 91 abruptly at the edges of the rib 101. Consequently, in such a case, when the upper casing member 27a is fitted to the lower casing member 27b, the air existing between the casing members 27a and 27b would be left over without escaping therefrom.

Figure 10B:
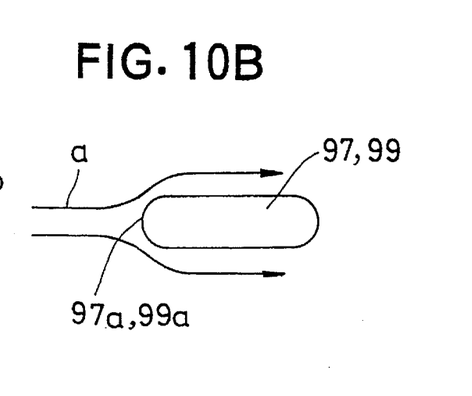
FIG. 10B is a plan view showing a relationship between of the flow of the sealant and a positioning rib of the third embodiment having curved surfaces.

On the contrary, according to the embodiment, when the upper casing member 27a is fitted to the lower casing member 27b, the sealant 91 can flow smoothly along the curved surfaces 97a and 99a as shown in FIG. 10B. Therefore, it is possible to push away the air left between the casing members 27a and 27b, whereby the problem of air bubbles in the vicinity of the surfaces 97a and 99a of the positioning ribs 97 and 99 can be eliminated.

Further, according to the present embodiment, by the provision of the positioning ribs 97 and 99 which stand from the bottom wall 57b of the lower casing member 27b, it allows the wires 81, 83 and 87 to be positioned in the storage chamber 55b thereby to fix the wires 81, 83 and 87 on the casing members 27a and 27b, restricting any movements of the wires in the chamber 55b.

Finally, it will be understood by those skilled in the art that the forgoing description of the preferred embodiments of the disclosed structure, and that various changes and modifications may be made to the present invention without departing from the spirit and scope thereof.

What is claimed is:

1. A waterproof protective cover for protecting a connection portion of electrical wires in a waterproof manner, comprising:

first and second casing members each having at least one side wall, closable together to form a common interior chamber having an aperture at each end to pass electrical wires therethrough, wherein the first and second casing member side walls are joined along a common edge extending in an axial dimension by a hinge;

an insulating sealant filling said chamber; and at least one rib means having a semi-circular cross section, extending axially along and formed on an interior side of at least one of said casing members, for reinforcement of said at least one of said casing members.

2. The waterproof protective cover of claim 1, wherein at least one of said casing members further includes partition walls formed on both sides of a bottom wall in said longitudinal direction thereof and which define a sealant-charging section to be filled with said insulating sealant in said storage chamber when said first casing member is fitted to said second casing member and wherein said reinforcement rib means is arranged in said sealant-charging section.

3. The waterproof protective cover of claim 1, wherein said reinforcement rib means have curved surfaces at both ends in the longitudinal direction thereof adapted to smooth the flowing of said insulating sealant when said casing members are fitted together.

4. The waterproof protective cover of claim 1, further including a flexible engagement wall elongated in the axial direction extending parallel to the side wall of said first casing member and at least one projection extending from said second casing member adapted to engage the flexible engagement wall.

5. The waterproof protective cover of claim 1, wherein said reinforcement rib means have a cross section being to intrude radially between the electrical wires such that insulating sealant flow responsive to closure of the case members further separates the wires.

6. The waterproof protective cover of claim 1, wherein each of said casing members includes on an interior side thereof two pair of reinforcement rib means, each of said reinforcement rib means having a semi-circular cross-section.

7. The waterproof protective cover of claim 2, wherein said partition walls are provided on both casing members and wherein, when said casing members are fitted together, said partition walls define through-holes for passing said electrical wires therethrough.

8. The waterproof protective cover of claim 2, wherein at least one of said casing members is provided in the vicinity of said partition walls thereof with wire-fixing rib means for fixing said electrical wires to said casing members.

9. The waterproof protective cover of claim 4, said flexible engagement wall further including at least one engagement aperture adapted to receive therein said at least one projection.

10. The waterproof protective cover of claim 8, wherein said wire-fixing rib means consist of a plurality of flexible vertical walls which extend inwardly from said side wall of said casing member, and further including spherical supports which are arranged on respective upper ends of said vertical walls to support said electrical wires inserted therebetween.

11. The waterproof protective cover of claim 10, wherein at least one of said casing members is provided in said wire-fixing rib means thereof and in the vicinity of said hinge with a thickened part for reinforcement and wherein the other casing member is provided on said sidewall thereof close to said hinge with a projection which is brought into contact with said thickened part thereby to press said wire-fixing rib means toward an adjacent wire-fixing rib when said casing members are fitted together.

12. The waterproof protective cover of claim 8, wherein said reinforcement rib means are axially elongated, with rounded vertical edges adapted to improve flow of insulating sealant therearound.

13. The waterproof protective cover of claim 8, wherein said wire-fixing rib means consist of a plurality of flexible vertical walls which extend inwardly from said side wall of said casing member, and spherical supports which are arranged on respective upper ends of said vertical walls to support said electrical wires inserted therebetween.

14. The waterproof protective cover of claim 10, wherein at least one of said casing members is provided in said wire-fixing rib means thereof and in the vicinity of said hinge with a thickened part for reinforcement and wherein the other casing member is provided on said sidewall thereof close to said hinge with a projection which is brought into contact with said thickened part thereby to press said wire-fixing rib means toward the adjacent wire-fixing rib when said casing members are fitted together.

15. The method of sealing a connection portion of electrical wires in a waterproof protective cover, comprising the steps of:

a) providing, in an open condition, first and second casing members each having at least one side wall, closable together to form a common interior chamber having an aperture at each end to pass electrical wires therethrough, wherein the first and second casing member side walls are joined along a common edge extending in an axial dimension by a hinge, at least one of said casing members including wire securing members;

b) charging the first and second casing members with an insulating sealant sufficient to fill said chamber;

c) positioning the connection portion within the casing members and securing the connection portion with said wire securing members; and d) closing the casing members together and securing them.

16. The method of claim 15, wherein at least one of the casing members includes at least one longitudinal reinforcement rib means having rounded longitudinal edges, further including the step of retaining the wires in a desired configuration within the closed casing members with the reinforcement rib means.

17. The method of claim 15, wherein the insulating sealant is selected within a stickiness value in a range of between about $3.5 \times 10^4$ poise at 40 degrees C. to about $4.5 \times 10^4$ poise at 40 degrees C.

18. The method of claim 15, wherein the step of closing the casing members forces insulating sealant to flow within said interior chamber and to flow around the connection portion to effectively seal the connection portion against moisture intrusion thereinto.

19. The method of claim 16, wherein the insulating sealant selected has a sufficiently high stickiness to avoid abrupt changes in direction of flowing insulating sealant at the edges of the reinforcement rib means, thereby limiting the formation of air bubbles.

20. A waterproof protective cover for protecting a connection portion of electrical wires in a waterproof manner, comprising:

first and second casing members each having at least one side wall, closable together to form a common interior chamber having an aperture at each end to pass electrical wires therethrough, wherein the first and second casing member side walls are joined along a common edge extending in an axial dimension by a hinge;

an insulating sealant filling said chamber;

at least one rib means having a semi-circular cross section, extending axially along and formed on an interior side of at least one of said casing members, for reinforcement of said at least one of said casing members; and at least one wire-fixing rib means formed on at least one of said casing members for fixing said electrical wires to said casing members.

* * * * *